(12) United States Patent
Wang (10) Patent No.: US 11,648,617 B2
(45) Date of Patent: May 16, 2023

(54) SELF-DUST EXTRACTION DUSTLESS TABLE SAW

(71) Applicant: YONGKANG CONGZHEN TOOLS CO., LTD., Zhejiang (CN)

(72) Inventor: Xiao Wang, Yongkang (CN)

(73) Assignee: YONGKANG CONGZHEN TOOLS CO., LTD., Yongkang (CN)

( * ) Notice: Subject to any disclaimer, the term of this patent is extended or adjusted under 35 U.S.C. 154(b) by 0 days.

(21) Appl. No.: 17/404,067

(22) Filed: Aug. 17, 2021

(65) Prior Publication Data

US 2022/0388082 A1   Dec. 8, 2022

(30) Foreign Application Priority Data

Jun. 7, 2021  (CN) .......................... 202110630615.2

(51) Int. Cl.
  *B23D 59/00*  (2006.01)
  *B27G 19/02*  (2006.01)
  *B23D 47/02*  (2006.01)
  *B23Q 11/00*  (2006.01)

(52) U.S. Cl.
  CPC ......... *B23D 59/006* (2013.01); *B23D 47/025* (2013.01); *B27G 19/02* (2013.01); *B23Q 11/0046* (2013.01); *Y10T 83/207* (2015.04); *Y10T 83/773* (2015.04)

(58) Field of Classification Search
  CPC ........ B23D 59/0006; B23D 45/06–068; B23D 47/025; B23D 59/006; Y10T 83/773; Y10T 83/7734; Y10T 83/2077; Y10T 83/7697; Y10T 83/7722; Y10T 83/207; B23Q 11/0046; B27G 3/00
  See application file for complete search history.

(56) References Cited

U.S. PATENT DOCUMENTS

| 1,789,569 | A | * | 1/1931 | Tannewitz | B23Q 11/0046 |
| | | | | | 29/DIG. 82 |
| 2,574,161 | A | * | 11/1951 | Anderson | B23Q 11/0046 |
| | | | | | 406/100 |
| 3,669,163 | A | * | 6/1972 | Crane | B27B 13/16 |
| | | | | | 83/788 |
| 3,882,598 | A | * | 5/1975 | Earle | B23D 59/006 |
| | | | | | 269/21 |

(Continued)

FOREIGN PATENT DOCUMENTS

| CN | 106239628 A | * 12/2016 | ........... B23D 59/006 |
| CN | 113771139 A | * 12/2021 | ............... B27B 5/29 |

(Continued)

*Primary Examiner* — Laura M Lee
(74) *Attorney, Agent, or Firm* — Bayramoglu Law Offices LLC (57) ABSTRACT

A self-dust extraction dustless table saw includes a table saw frame, saw table, and saw blade installed to the table saw frame. An upper and a lower blade guards are respectively mounted to upper and lower sides of the saw table, the saw blade is mounted in the upper and lower blade guards, and the lower blade guard includes a lower left and lower-right blade guards. Several interval guide barriers are installed on the inner walls of the lower left and lower right blade guards, and the guide barriers transport the dust to a dust outlet on the side of the lower right blade guard.

7 Claims, 6 Drawing Sheets

(56) References Cited

U.S. PATENT DOCUMENTS

| | | | | |
|---|---|---|---|---|
| 4,201,256 A * | 5/1980 | Truhan | B01D 45/12 144/252.2 |
| 6,651,710 B2 * | 11/2003 | Chuang | B27C 1/14 409/137 |
| 6,925,919 B2 * | 8/2005 | Liao | B23D 47/12 83/477.1 |
| 8,726,773 B2 * | 5/2014 | Koegel | B27B 5/202 83/99 |
| 8,752,462 B2 * | 6/2014 | Frolov | B27B 5/243 83/100 |
| 8,844,415 B2 * | 9/2014 | Taylor | B23D 59/006 83/99 |
| 8,869,665 B2 * | 10/2014 | Dammertz | B23D 59/006 83/98 |
| 9,517,516 B2 * | 12/2016 | Doumani | B23D 45/065 |
| 9,821,389 B2 * | 11/2017 | Buser | A47L 1/00 |
| 9,827,625 B2 * | 11/2017 | Koegel | F16L 27/111 |
| 10,022,811 B2 * | 7/2018 | Stasiewicz | B23D 47/025 |
| 10,092,968 B2 * | 10/2018 | Fulmer | B23D 45/06 |
| 10,239,136 B2 * | 3/2019 | Guth | B23D 47/045 |
| 10,328,507 B2 * | 6/2019 | Koegel | B23Q 17/2419 |
| 10,695,937 B2 * | 6/2020 | Yu | B27B 5/24 |
| 10,737,338 B2 * | 8/2020 | Stasiewicz | B23D 47/025 |
| 11,273,505 B2 * | 3/2022 | Hansen | B23D 59/006 |
| 2004/0237743 A1 * | 12/2004 | Liao | B23D 45/068 83/477.2 |
| 2004/0248507 A1 * | 12/2004 | Brazell | B23Q 11/0046 451/361 |
| 2007/0215243 A1 * | 9/2007 | Bauer | B23D 45/068 144/1.1 |
| 2008/0011138 A1 * | 1/2008 | Brazell | B28D 7/02 83/100 |
| 2010/0058911 A1 * | 3/2010 | Goddard | B23D 59/006 83/478 |
| 2011/0023674 A1 * | 2/2011 | Stasiewicz | B23D 47/025 83/477.1 |
| 2012/0036972 A1 * | 2/2012 | Frolov | B23D 59/006 83/477.2 |
| 2012/0090440 A1 * | 4/2012 | Koegel | B27B 5/202 83/100 |
| 2013/0104714 A1 * | 5/2013 | Dammertz | B23D 59/006 83/98 |
| 2014/0041142 A1 * | 2/2014 | Theising | B27G 3/00 15/246.2 |
| 2014/0260859 A1 * | 9/2014 | Doumani | B23D 45/066 83/165 |
| 2016/0016241 A1 * | 1/2016 | Taylor | B23Q 11/0067 83/167 |
| 2016/0318109 A1 * | 11/2016 | Koegel | B23D 45/06 |
| 2016/0332244 A1 * | 11/2016 | Koegel | B23Q 17/2419 |
| 2017/0252841 A1 * | 9/2017 | Wang | B27G 19/02 |
| 2018/0311861 A1 * | 11/2018 | Yu | B23D 59/006 |
| 2022/0314348 A1 * | 10/2022 | Yu | B27B 5/207 |
| 2023/0012153 A1 * | 1/2023 | Wang | B23D 59/006 |

FOREIGN PATENT DOCUMENTS

| | | | | |
|---|---|---|---|---|
| DE | 102016123179 A1 * | 5/2018 | | B23D 59/006 |
| EP | 601805 A1 * | 6/1994 | | B23D 59/006 |
| FR | 2467670 A1 * | 4/1981 | | B23D 59/006 |
| WO | WO-9703793 A1 * | 2/1997 | | B23Q 11/0046 |

* cited by examiner

SELF-DUST EXTRACTION DUSTLESS TABLE SAW

CROSS REFERENCE TO RELATED APPLICATIONS

This application claims priority to Chinese patent application No. 202110630615.2 filed on Jun. 7, 2021, which is incorporated herein by reference in its entirety.

FIELD OF THE INVENTION

The present invention relates to the field of the technology of table saw, in particular to a self-dust extraction dustless table saw.

BACKGROUND OF THE INVENTION

Table saw is widely configured in the timber-processing industry for cutting various materials, such as wood, MDF (medium-density fiberboard), HDF (high-density fiberboard), or other material and composite board. At present, traditional tools usually produce a large amount of sawduce when cutting wood materials, debris is usually scattered over a wide area and fine dust is also released into the air. It does not only pollute the environment, but inhalation of the fine dust may also harm the health of the people exposed to this environment.

In response to the above problems, there are some dustless table saws on the market equipped with an extraction system, however, these table saws do not extract dust very well, and still, leave lots of dust behind. Some of these dustless table saws need to have a separate dust extraction motor, that is, there are two motors in total. One motor is configured for cutting, and the other is configured for extracting dust, which causes higher costs. At the bottom of the motor, some of these dustless table saws have installed the self-dust extraction blades that are generally driven by a belt, which lead to a complicated structure. They are impractical and difficult to promote and use to small-scale table saws that are widely configured in the workshop.

So that, there is an urgent need to invent a self-dust extraction dustless table saw with a simple structure, a self—dust extraction system, a high dust extraction efficiency, and a wide range of applications.

SUMMARY OF THE INVENTION

The object of this invention is to solve the shortcomings of the prior art and provide a self-dust extraction dustless table saw.

The specific technical solution of the present invention are as follows:

The present invention provides a self-dust extraction dustless table saw comprising: a table saw frame with a saw table and a saw blade mounted to the table saw frame, an upper blade guard and a lower blade guard respectively mounted to the upper and lower sides of the said saw table, and the saw blade mounted in the upper and lower blade guard; wherein the said lower blade guard includes a lower left blade guard and lower-right blade guard, wherein several scattered interval guide barriers are installed on the inner walls of the said lower left blade guard and said lower right blade guard, and are configured to transport the dust generated by the saw blade to the dust outlet located at the side of the lower right blade guard.

Preferably, the guide barriers include several first dust barriers, several second dust barriers, and the third dust barrier;

the first dust barriers are located between the entrance of the saw blade and the center window of the lower blade guard, and are configured to guide dust to the lower cavity;

the second dust barriers are located at the lower part of the lower blade guard, and are configured to guide the dust to the dust outlet;

the third dust barrier is located near the dust outlet and is configured to guide the dust that is brought to the upper cavity by the rotation of the saw blade to the dust outlet.

Preferably, a partition plate is placed at the dust outlet along the airflow direction, and is configured to divide the dust outlet into an upper dust exhaust cavity and a lower dust exhaust cavity;

the lower dust exhaust cavity is the main dust extraction channel, which is configured to extract out most of the dust from the lower dust exhaust cavity; and the upper dust exhaust cavity is the auxiliary dust extraction channel, which is configured to extract out a small part of the dust that is taken away from the lower dust exhaust cavity by the high-speed rotating saw blade from the upper dust exhaust cavity, thereby ensuring the maximum dust extraction effect;

one end of the third dust barrier is connected to the partition plate.

Preferably, a dust cleaning cover is installed at the lower-left blade guard.

Preferably, the said a self-dust extraction dustless table saw further comprise: a tee, the said tee are respectively connected to an upper dust extraction tube of the upper blade guard, and a dust outlet and a dust exhaust tube of the lower blade guard.

Preferably, the suspension structure of the said table saw is a specially designed single fulcrum suspension structure for adjusting the parallelism of the saw blade in a 45 degrees state. Compared with the previously commonly configured single fulcrum suspension structure, this structure has a more accurate parallel cutting precision, especially at 45-degree cutting.

Preferably, the said suspension structure comprises the first table locating slot, the second table locating slot, the first adjusting screw hole, the second adjusting screw hole, a center hinge pin, the first pressure plate, the second pressure plate, and the third screw; wherein The first and second table locating slots are coaxial and set under the saw table, the first adjusting screw hole and the second adjusting screw hole with capable to adjust the parallelism of the saw blade in a 45 degrees state are set on the saw table, under the saw table, a table circular bulge is located between the first adjusting screw hole and the second adjusting screw hole, the cylinders at both ends of the center hinge pin are correspondingly mounted to the first table locating slot and the second table locating slot, the first pressure plate is installed at the first table locating slot, and the second pressure plate is installed at the second table locating slot.

Preferably, the said self-dust extraction dustless table saw further comprises: a motor, the said motor successively comprise: a bearing cover, a gear, an output shaft, a volute A, a volute B, a windshield A, a windshield B, an armature component, a stator component, a casing, and a casing back cover.

Preferably, the armature component is a single fan blade rotor. That is, the motor heat dissipation fan blade and the dust extraction fan blade combined into one fan blade, the motor dissipation air-ducts and dust extraction air-ducts are cleverly separated through the unique design of the blade and the cooperation of the volute, without interfering with each other.

Preferably, the said a self-dust extraction dustless table saw further comprises a dust collection bag which connected to the motor via a hose.

Compared with the prior art, the technical solution of the present invention has the following advantages:

1) The invention achieves better dust extraction efficiency, higher accuracy of right-angle cutting and tilting-angle cutting of table saw through the unique design of the upper and lower dust extraction air-ducts, the dust barriers at both sides of the lower blade guard, the specific extraction structure, and the suspension structure.

2) The lower blade guard of the present invention cleverly guides the direction of dust and into the tee connection during cutting through the way of the internal dust barriers.

3) The present invention effectively solves the problem of dust extraction of the table saw and has high dust extraction efficiency through the design of a compact self-dust extraction structure and the design of a single fan blade motor, that is, the heat dissipation fan blade and the dust extraction fan blade combined into one fan blade, the motor dissipation air-ducts and dust extraction air-ducts are cleverly separated through the unique design of the blade and the cooperation of the volute.

REFERENCE SIGNS OF THE DRAWINGS

1. Table saw frame, 2. Saw table, 3. Saw blade, 4. Upper blade guard, 5. Lower blade guard, 6. Lower left blade guard, 7. Lower right blade guard, 8. Center window, 9. The first dust barrier, 10. The second dust barriers, 11. The third dust barrier, 12. Tee, 13. Upper dust extraction tube, 14. Dust outlet, 15. Partition plate, 16. Upper dust exhaust cavity, 17. Lower dust exhaust cavity, 17. Dust exhaust tube, 18. Dust cleaning cover, 19. Dust collection bag, 20. Motor, 21. Bearing cover, 22. Gear, 23. Output shaft, 24. Volute A, 25. Volute B, 26. Windshield A, 27. Windshield B, 28. Armature component, 29. Stator component, 30. Casing, 31. Casing back cover, 32. Center hinge pin, 33. The first adjusting screw hole, 34. The second adjusting screw hole, 35. The first table locating slot, 36. The second table locating slot, 37. Table circular bulge, 38. The first pressure plate, 39. The second pressure plate, 40. The first adjusting screw, 41. The second adjusting screw, 42. The third screw.

DETAILED DESCRIPTION OF THE EMBODIMENTS

The present invention will be further described below in conjunction with the Figures.

Figure 1:
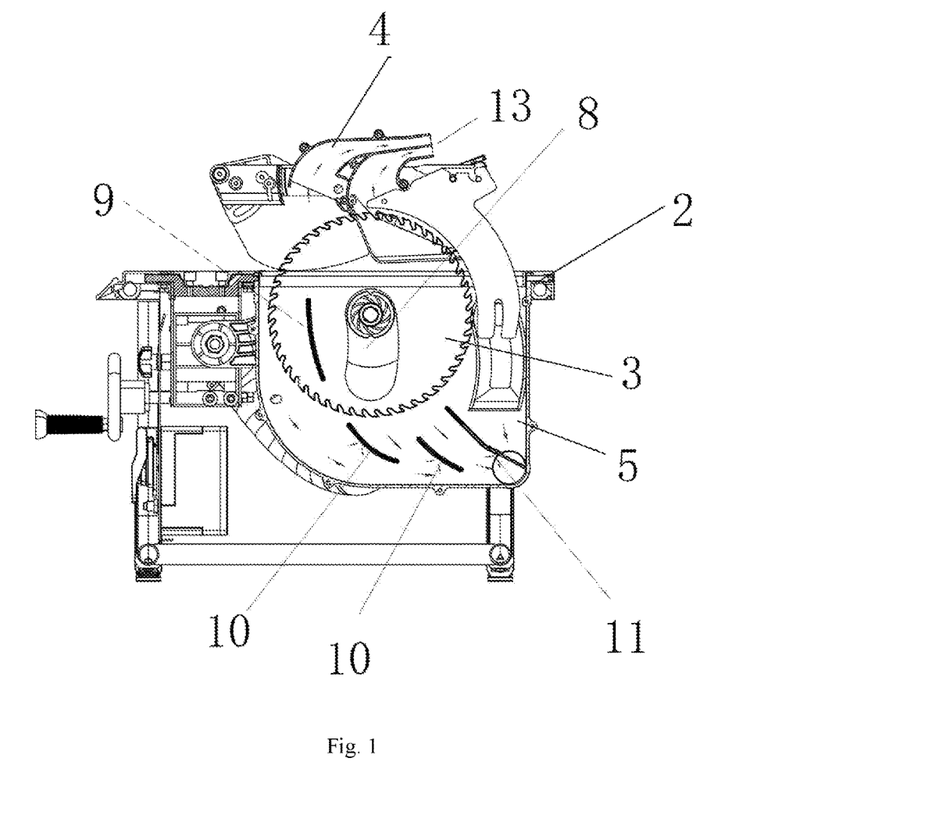
FIG. 1 is a cross-sectional view of the self-dust extraction dustless table saw of the present invention.
Figure 2:
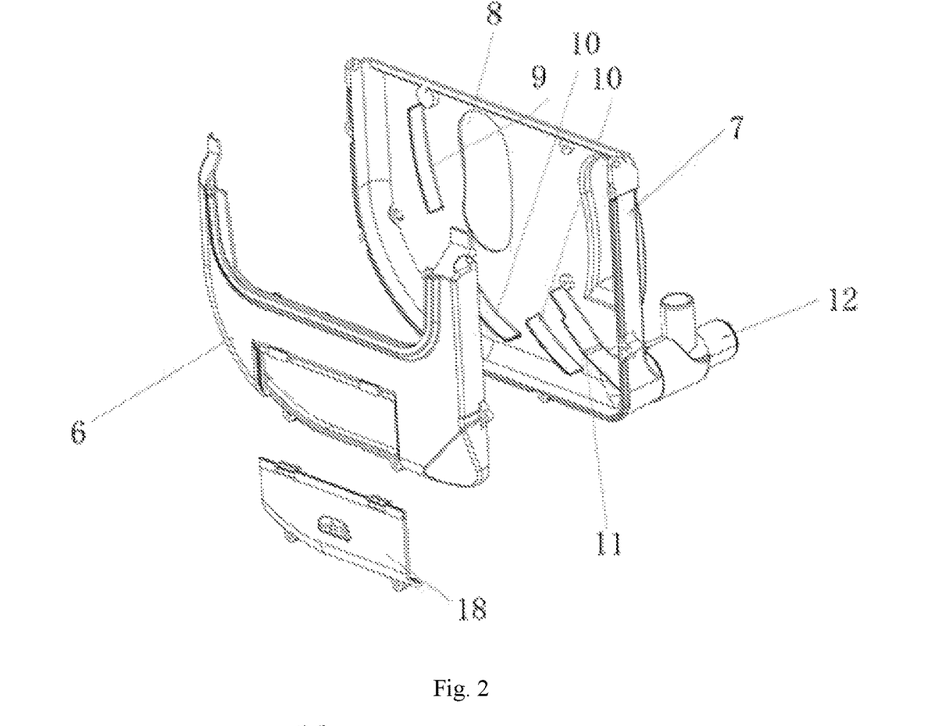
FIG. 2 is a cross-section view of the lower blade guard of the self-dust extraction dustless table saw of the present invention.
Figure 3:
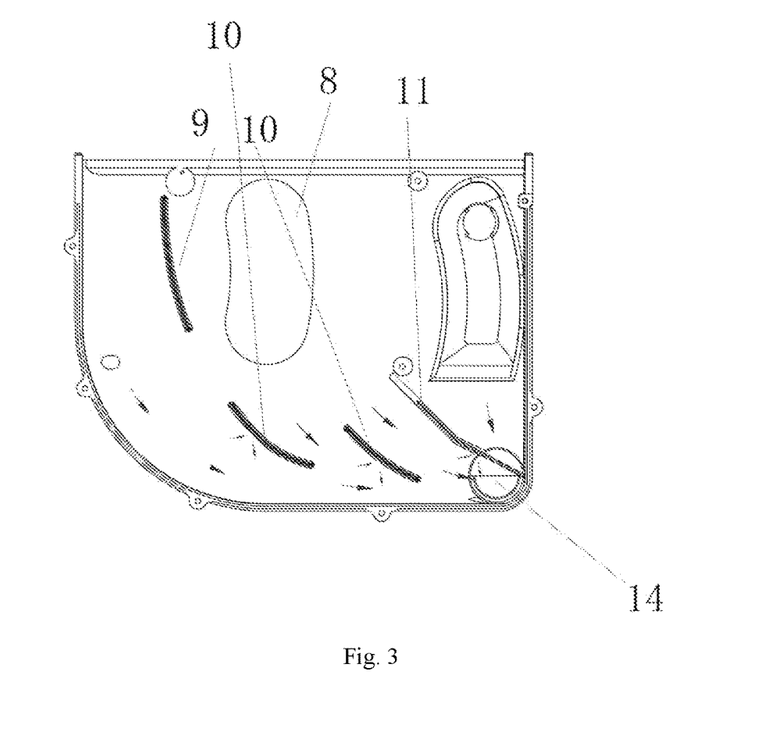
FIG. 3 is an inner view of the lower right blade guard of the self-dust extraction dustless table saw of the present invention.

A self-dust extraction dustless table saw is provided in the present invention, referring to FIG. 1 to FIG. 3, comprises: a table saw frame 1, and a saw table 2 and a saw blade 3 both mounted to the table saw frame 1, an upper blade guard 4 and a lower blade guard 5 respectively mounted to the upper and lower sides of the said saw table 2, and the saw blade 3 mounted in the upper blade guard 4 and lower blade guard 5; when the upper blade guard 4 guides the cutting, the dust under the saw table 2 enters the tee 12 through the upper dust extraction tube 13.

the said lower blade guard 5 includes a lower left blade guard 6 and lower-right blade guard 7, wherein several interval guide barriers are installed on the inner walls of the said lower left blade guard 6 and said lower right blade guard 7, and are configured to transport the dust generated by the saw blade 3 to the dust outlet 14 located at the side of the lower right blade guard 7.

Wherein, the said guide barriers include the several first dust barriers 9, several second dust barriers 10, and the third dust barrier 11;

the first dust barrier 9 is located between the entrance of the saw blade 3 and the center window 8 of the lower blade guard 5, and is configured to guide dust to the lower cavity;

the second dust barriers 10 are located at the lower part of the lower blade guard 5, and are configured to guide the dust to the dust outlet;

the third dust barrier 11 is located near the dust outlet 14 (located above the first dust barrier 9 near the dust outlet 14) which is configured to guide the dust that is brought from the upper cavity by the rotation of the saw blade 3 to the dust outlet 14. A partition plate 15 is placed at the dust outlet 14 along the airflow direction and the partition plate 15 is configured to divide the dust outlet 14 into an upper dust exhaust cavity 16 and a lower dust exhaust cavity 17.

The lower dust exhaust cavity 17 is the main dust extraction channel, which is configured to extract out most of the dust from the lower dust exhaust cavity; and the upper dust exhaust cavity 16 is the auxiliary dust extraction channel, which is configured to extract out a small part of the dust that is taken away from the lower dust exhaust cavity by the high-speed rotating saw blade from the upper dust exhaust cavity, thereby ensuring the maximum dust extraction effect;

One end of the third dust barrier 11 is connected to the partition plate 15; that is, one end of the third dust barrier 11 extends through up the edge of the partition plate 15 to the edge of the dust outlet 14.

Figure 4:
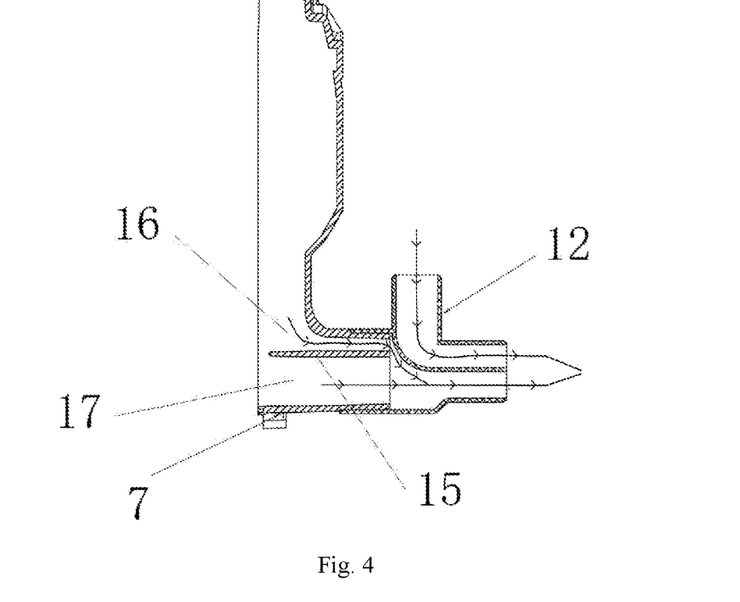
FIG. 4 is a center-center section view of the lower right blade guard and the tee of the self-dust extraction dustless table saw of the present invention.
Figure 5:
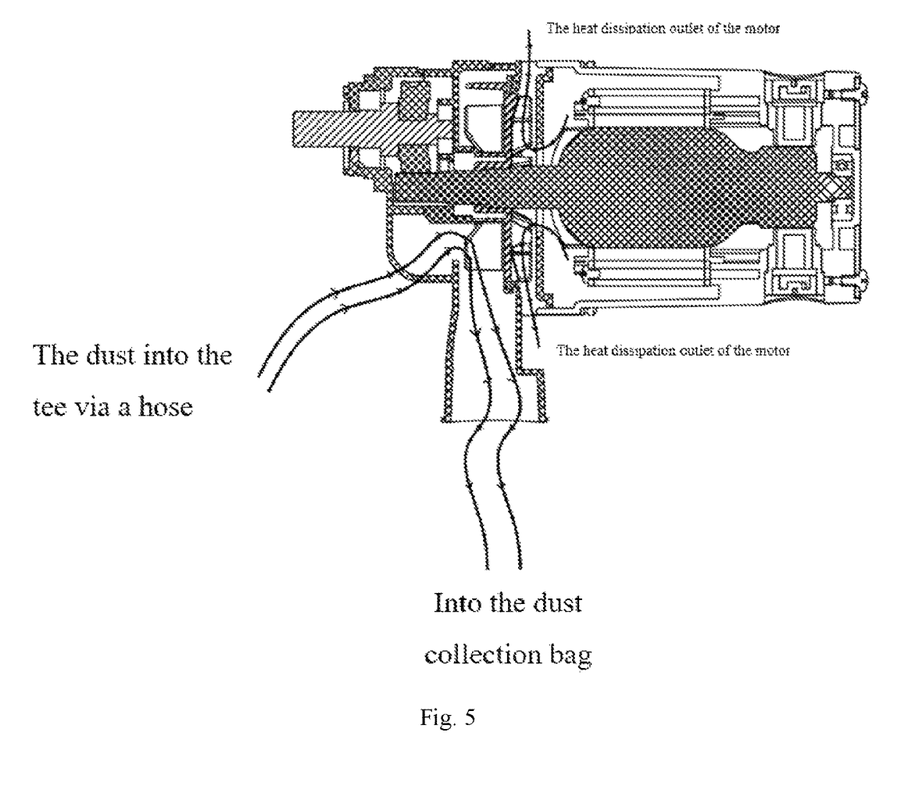
FIG. 5 is a sketch map of dust extraction air-ducts of the self-dust extraction dustless table saw of the present invention.

The specific working process is as follows: the dust enters the lower dust exhaust cavity through the first dust barrier 9 and the second dust barriers 10, the dust enters the upper dust exhaust cavity through the third dust barrier 11, then the dust flows into the tee through the dust exhaust tube, and lead to the dust collection bag, as shown in FIG. 4-FIG. 5, the dust follows the arrow and is finally extracted into the tee.

Preferably, a dust cleaning cover 18 is installed at the lower-right blade guard 6.

Preferably, the said table saw is a suspension structure. The special design of the suspension structure makes the cutting more accurate.

Figure 6:
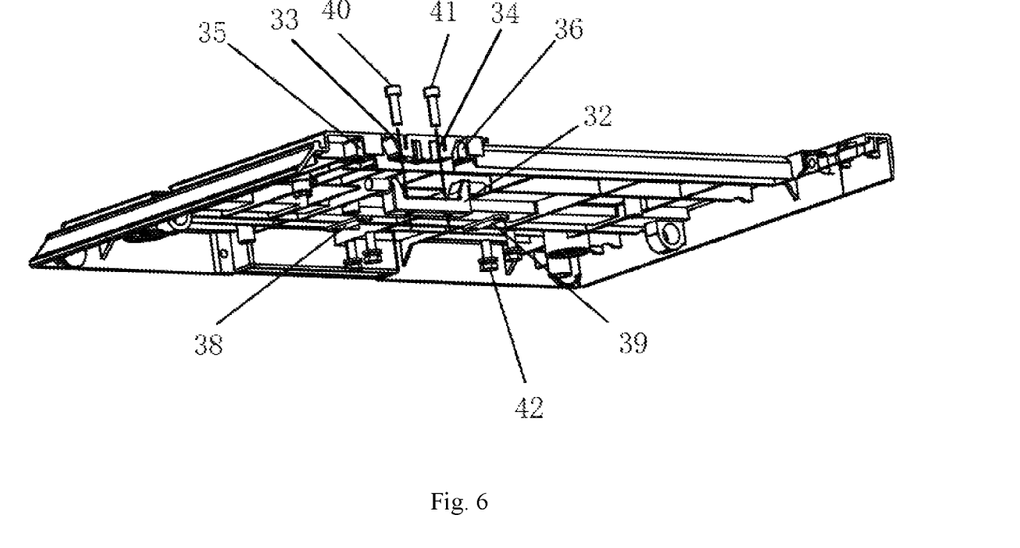
FIG. 6 is an exploded view of the suspension structure of the self-dust extraction dustless table saw of the present invention.
Figure 7:
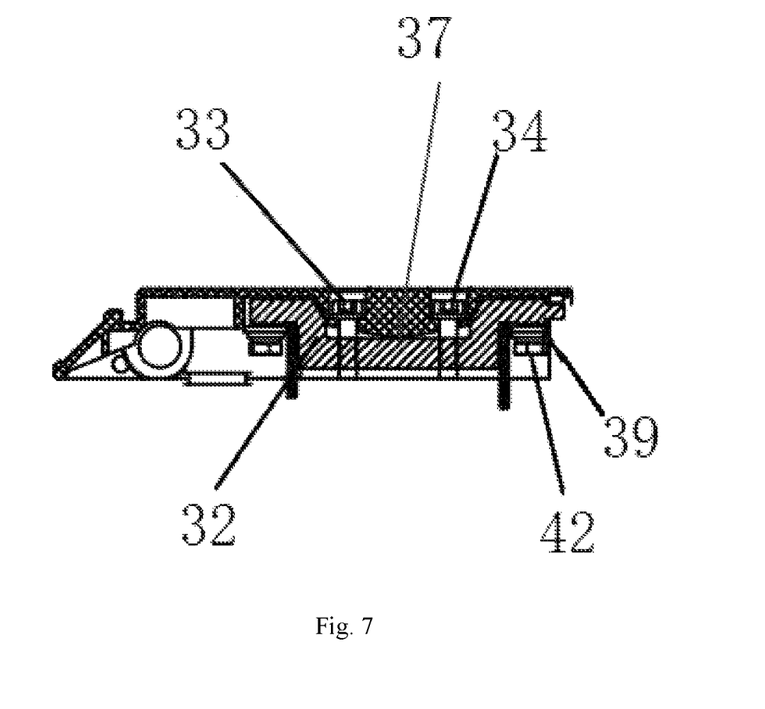
FIG. 7 is a schematic diagram of the suspension structure and the table circular bulge of the self-dust extraction dustless table saw of the present invention.

The said suspension structure is described as follows;

As shown in FIG. 6-FIG. 7, The first table locating slot 35 and the second table locating slot 36 are coaxial and set under the saw table, the first adjusting screw hole 33 and the second adjusting screw hole 34 with capable to adjust the parallelism of the saw blade in a 45 degrees state are set on the saw table, the first adjusting screw hole 33 is correspondingly installed to the first adjusting screw 40, the second adjusting screw hole 34 is correspondingly installed to the second adjusting screw 41, under the saw table, a table circular bulge 37 is located between the two adjusting screw holes, the cylinders at both ends of the center hinge pin 32 are correspondingly installed in the first table locating slot 35 and the second table locating slot 36, then the first pressure plate 38 and the second pressure plate 39 are installed, the center hinge pin is installed in the table location slots, the pressure plates are fixed on the pressure plate installation surface under the table via the third screw 40. After all of the installations are completed, as long as the first adjusting screw hole 33 and the first adjusting screw 40, and the second adjusting screw hole 34 and the second adjusting screw 41 on the saw table are adjusted, the center hinge pin can form the states of higher at the front and lower at the end or lower at the front and higher at the end, which is similar to a seesaw, to adjust the parallelism of the saw blade in a 45 degrees state.

Figure 8:
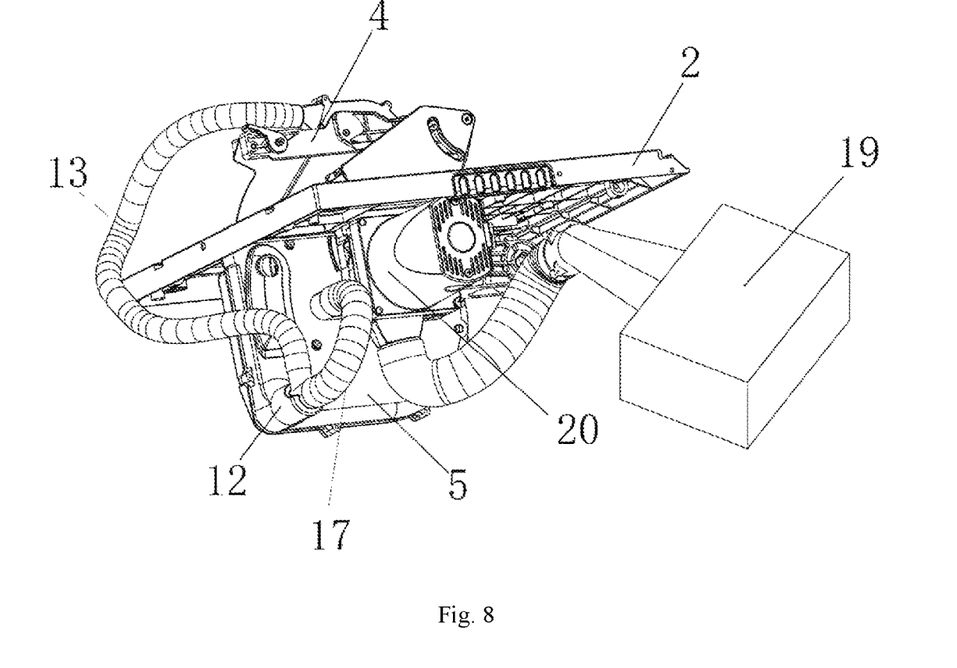
FIG. 8 is a three-dimensional schematic diagram of the self-dust extraction dustless table saw of the present invention.
Figure 9:
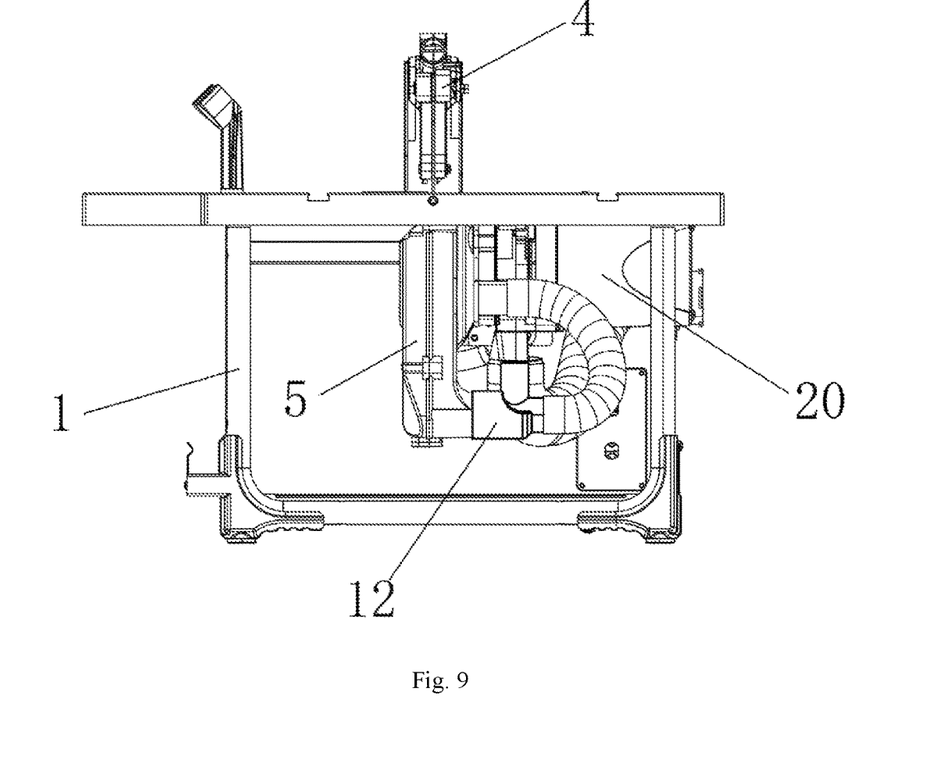
FIG. 9 is a front view of the self-dust extraction dustless table saw of the present invention.
Figure 10:
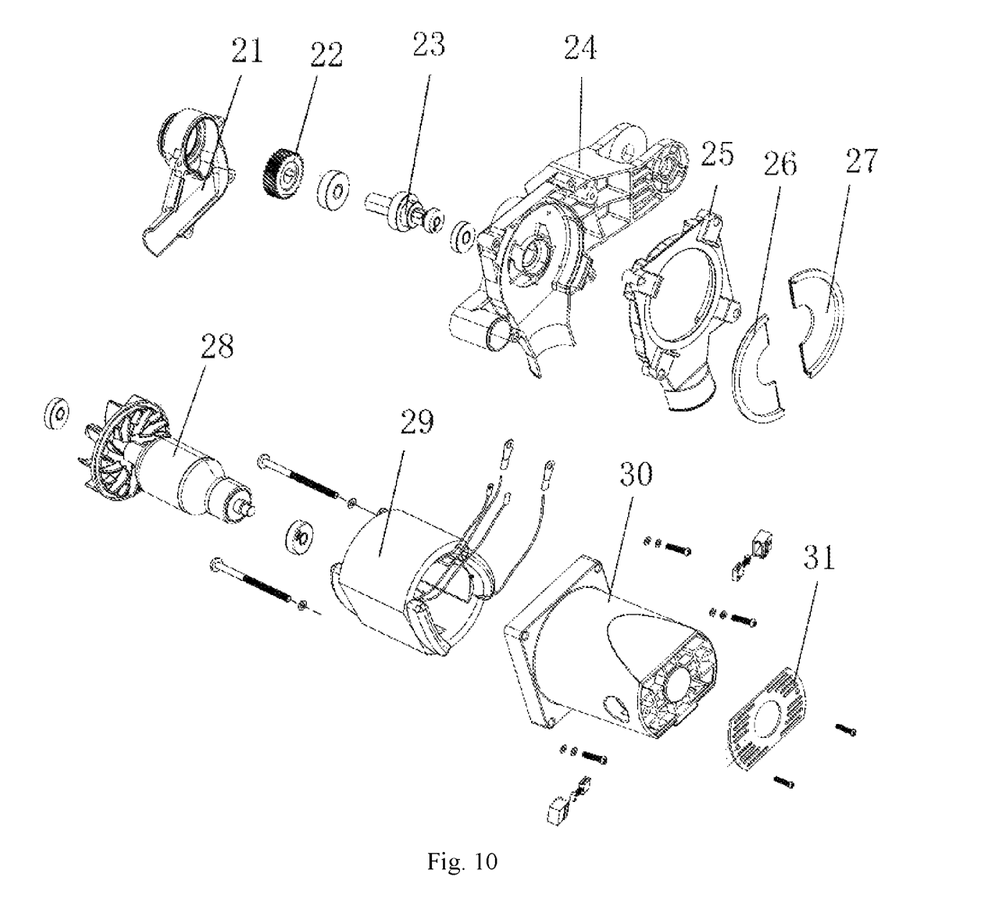
FIG. 10 is an exploded view of the motor structure of of the self-dust extraction dustless table saw of the present invention.

As shown in FIG. 8-10, the said self-dust extraction dustless table saw further includes: the tee 12, the dust collection bag 19, and the motor 20; the said tee 12 are respectively connected to the upper dust extraction tube 13 of the upper blade guard, the dust outlet 14 of the lower blade guard, and the dust exhaust tube 17; the said dust collection bag 19 is connected to the motor 20 via hose; as shown in FIG. 8, the said motor 20 successively comprise: the bearing cover 21, the gear 22, the output shaft 23, the volute A 24, the volute B 25, the windshield A 26, the windshield B 27, the armature component 28, the stator component 29, the casing 30 and the casing back cover 31. Wherein, the said armature component 28 is a single fan blade rotor. That is, the heat dissipation fan blade and the dust extraction fan blade combined into one fan blade, the motor dissipation air-ducts and dust extraction air-ducts are cleverly separated through the unique design of the fan blade and the cooperation of the volute, without interfering with each other.

Any content not described in detail in the present invention can be obtained via conventional technical knowledge in the art.

Finally, it should be noted that the above embodiments are only configured for describing instead of limiting the technical solutions of the present invention. Although the present invention is described in detail with reference to the embodiments, persons of ordinary skill in the art should understand that modifications or equivalent substitutions of the technical solutions of the present invention should be encompassed within the scope of the claims of the present invention so long as they do not depart from the spirit and scope of the technical solutions of the present invention.

The invention claimed is:

1. A self-dust extraction dustless table saw, comprises: a table saw frame, a saw table, and a saw blade mounted to the table saw frame, upper blade guard and a lower blade guard respectively mounted to the upper and lower sides of the saw table, and the saw blade mounted in the upper and lower blade guard; wherein
   the lower blade guard includes a lower left blade guard and lower-right blade guard;
   several scattered intervals guide barriers are correspondingly installed on the inner walls of the lower left blade guard and lower right blade guard and are configured to transport the dust generated by the saw blade to a dust outlet located at the side of the lower right blade guard;
   the guide barriers include several first dust barriers, several second dust barriers, and a third dust barrier;
   the first dust barriers are located between an entrance of the saw blade and a center window of the lower blade guard, and are configured to guide dust to a lower cavity of the lower blade guard;
   the second dust barriers are located at the lower part of the lower blade guard, and are configured to guide the dust to the dust outlet;
   the third dust barrier is located near the dust outlet and is configured to guide the dust that is brought to an upper cavity of the lower blade guard by the rotation of the saw blade to the dust outlet;
   a partition plate is placed at the dust outlet along the airflow direction, and is configured to divide the dust outlet into the upper dust exhaust cavity and the lower dust exhaust cavity;
   the lower dust exhaust cavity is a main dust extraction channel, which is configured to extract out most of the dust;
   the upper dust exhaust cavity is an auxiliary dust extraction channel, which is configured to extract out a small part of the dust brought by the high-speed rotating saw blade;
   one end of the third dust barrier is connected to the partition plate;
   an air gap is disposed between the other end of the third dust barrier and the center window to enable airflow through the lower blade guard;
   wherein a tee is respectively connected to an upper dust extraction tube of the upper blade guard, the dust outlet, and a dust exhaust tube of the lower blade guard and comprises an internal wall for separating dust flow from the upper blade guard and the lower blade guard; and
   wherein the partition plate extends inside the tee spaced apart from any sidewall or internal wall of the tee to separate dust flow from the upper dust exhaust cavity and the lower dust exhaust cavity.

2. The self-dust extraction dustless table saw according to claim 1, wherein a dust cleaning cover is installed at the lower-left blade guard.

3. The self-dust extraction dustless table saw according to claim 1, wherein the self-dust extraction dustless table saw is a suspension structure, which is configured to adjust the parallelism of the saw blade in a 45 degrees state.

4. The self-dust extraction dustless table saw according to claim 3, wherein the suspension structure comprises the first table locating slot, the second table locating slot, the first adjusting screw hole, the second adjusting screw hole, a center hinge pin, the first pressure plate, and the second pressure plate; wherein the first locating slot and second table locating slot are coaxial and set under the saw table, the first adjusting screw hole and the second adjusting screw hole with capable to adjust the parallelism of the saw blade in a 45 degrees state are set on the saw table; under the saw table, a table circular bulge is located between the first adjusting screw hole and the second adjusting screw hole, the cylinders at both ends of the center hinge pin are correspondingly mounted to the first table locating slot and the second table locating slot, the first pressure plate is installed at the first table locating slot, and the second pressure plate is installed at the second table locating slot.

5. The self-dust extraction dustless table saw according to claim 1, wherein the self-dust extraction dustless table saw further comprises: a motor, the motor successively comprises: a bearing cover, a gear, an output shaft, a volute A, a volute B, a windshield A, a windshield B, an armature component, a stator component, a casing, and a casing back cover.

6. The self-dust extraction dustless table saw according to claim 5, wherein the armature component is a single fan blade rotor.

7. The self-dust extraction dustless table saw according to claim 1, wherein the self-dust extraction dustless table saw further comprise a dust collection bag which is connected to a motor via a hose.

\* \* \* \* \*